Oct. 12, 1937.  W. J. JOHNSON  2,095,875
FUEL SUPPLY SYSTEM AND VALVE FOR MOTOR VEHICLES
Filed Sept. 13, 1935  2 Sheets—Sheet 1

Inventor
William J. Johnson.
By Lacey & Lacey, Attorneys

Oct. 12, 1937.   W. J. JOHNSON   2,095,875
FUEL SUPPLY SYSTEM AND VALVE FOR MOTOR VEHICLES
Filed Sept. 13, 1935   2 Sheets-Sheet 2

Inventor
William J. Johnson.
By Lacy & Lacy,
Attorneys

Patented Oct. 12, 1937

2,095,875

UNITED STATES PATENT OFFICE 2,095,875

FUEL SUPPLY SYSTEM AND VALVE FOR MOTOR VEHICLES

William J. Johnson, Jackson Heights, N. Y.

Application September 13, 1935, Serial No. 40,496

4 Claims. (Cl. 158—46.5)

This invention relates to an improved fuel supply system for motor vehicles, and one object of the invention is to provide a fuel supply system including a main supply tank and an auxiliary tank or reserve tank together with pipes connecting the tanks with a carbureter or vacuum tank and a valve for controlling flow of liquid fuel through the pipes, the relation of parts being such that when fuel is being drawn from the main fuel tank and delivered to the carbureter or vacuum tank, surplus fuel delivered to the carbureter or vacuum tank will be delivered therefrom to the reserve tank and thus gradually build up a reserve supply of fuel to be used in emergencies such as when the fuel in the main tank is exhausted.

Another object of the invention is to provide a fuel system in which the reserve tank and valve controlled pipes establishing the desired communication between the reserve tank and the carbureter or vacuum tank may be very easily installed in a motor car having a main tank and a carbureter or vacuum tank of a conventional construction.

Another object of the invention is to provide the fuel system with a valve and actuating means of such construction that the valve may be very easily adjusted by the driver of the motor vehicle without leaving the driver's seat or stopping the motor vehicle and thus eliminate likelihood of an accident occurring due to stopping of the motor vehicle in such position upon a road that the operator of a following car is liable to collide with the vehicle which has stopped due to exhaustion of the fuel in the main tank.

The invention is illustrated in the accompanying drawings, wherein

Figure 1:
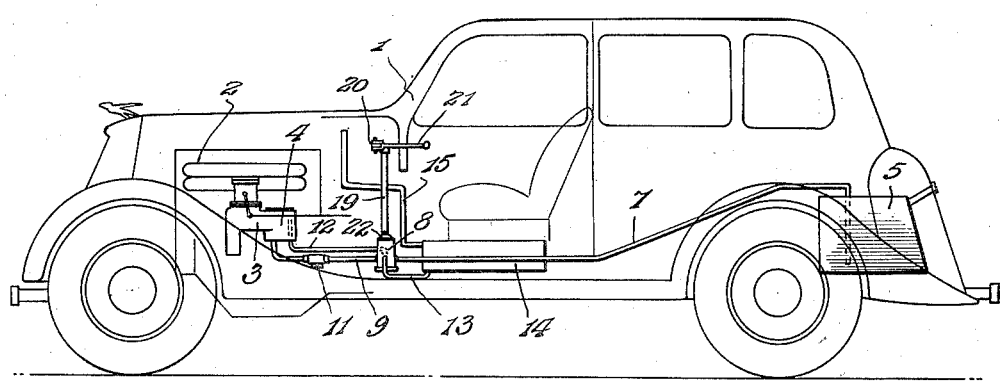
Figure 1 is a view showing the improved fuel system installed in an automobile of a conventional construction.
Figure 2:
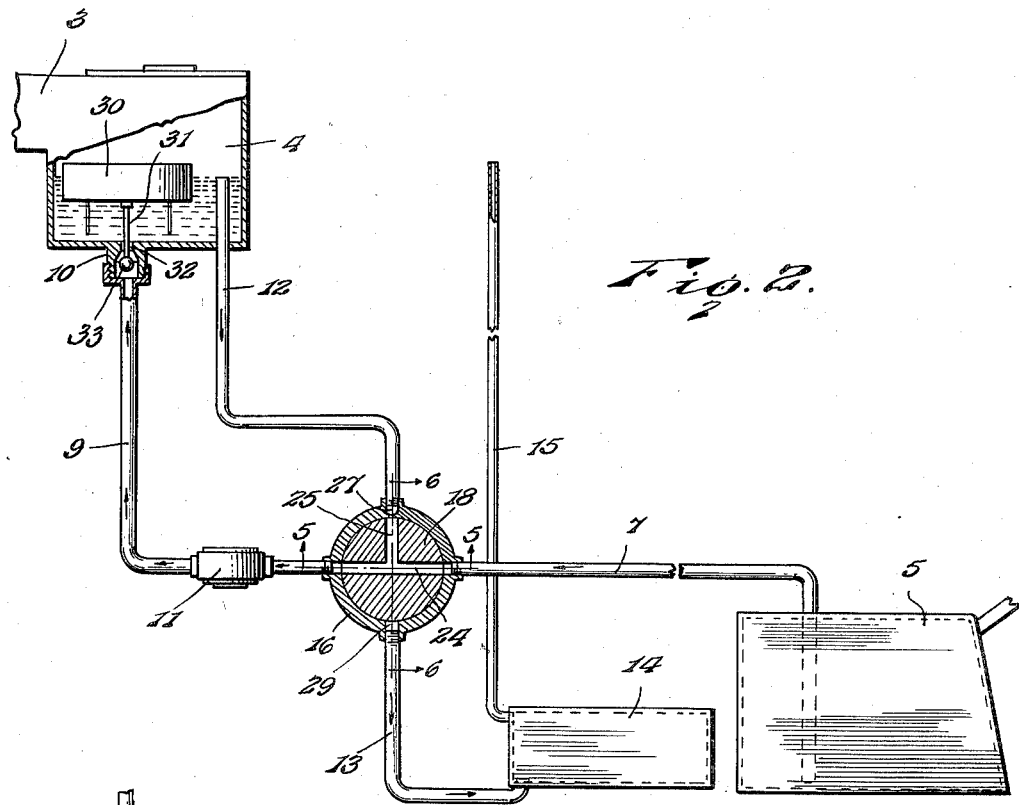
Figure 2 is an enlarged diagrammatic view of the fuel system with the valve turned to a position in which fuel will be drawn from the main tank and surplus fuel delivered from the carbureter to the reserve tank.

The automobile shown in Figure 1 and indicated in general by the numeral 1 is of a conventional construction and its engine 2 is also of a conventional construction and includes a carbureter 3 which may also be of any desired construction and includes a chamber 4 into which gasoline or other liquid fuel is delivered from a storage tank 5, the storage tank being shown at the rear of the automobile and gasoline being delivered from this tank either directly to the chamber 4 of the carbureter or into a vacuum tank 6 from which it flows to the carbureter. A pipe 7 leads from the storage tank to a valve 8 and from the valve extends a pipe 9 which leads to the carbureter 4 and has its forward end coupled to the depending inlet neck 10 of the carbureter. A pump 11 is interposed in the pipe 9 and may be operated in any manner desired from the engine in order to draw fuel from the storage tank and force the fuel through the pipe 9 and the neck 10 into the chamber of the carbureter, as shown in Figure 2. A fuel flow pipe 12 leads from the carbureter to the valve and from the opposite side of the valve extends a companion pipe 13 which communicates with a reserve tank 14. Referring particularly to Figure 2, it will be seen that the pipe 13 communicates with the reserve tank through the bottom thereof and that the pipe 12 has its forward end extending upwardly into the fuel chamber of the carbureter to such an extent that a sufficient quantity of gasoline may accumulate in the carbureter and surplus fuel overflow and pass through the pipe 12. A vent pipe 15 leads from the top of the reserve tank and rises to such a height that its upper end is disposed above the carbureter, as shown clearly in Figure 1. Therefore, when an automobile is traveling up or down a hill, the upper end of the vent pipe will be at such a height that leakage of gasoline from this pipe will be prevented and danger of fire eliminated.

Figure 4:
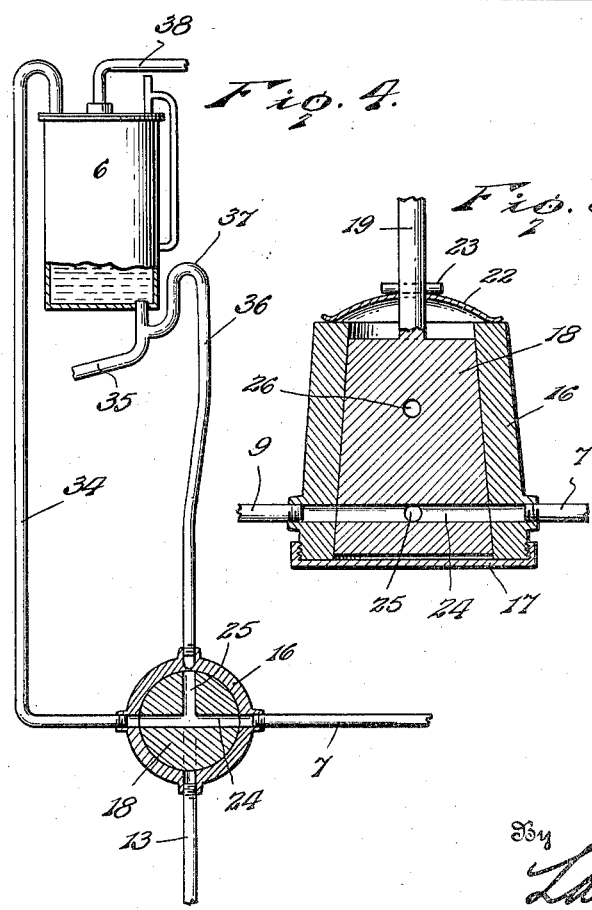
Figure 4 is a fragmentary view showing the arrangement of pipes which will be provided when a vacuum tank is used.
Figures 5, 6:
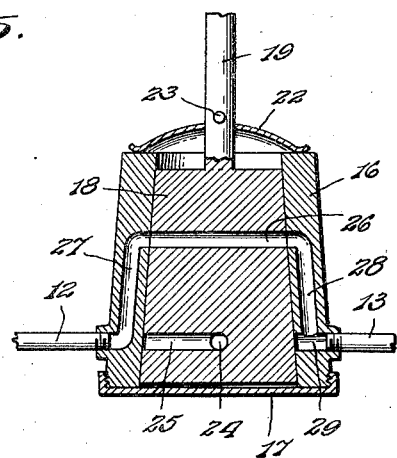
Figure 5 is an enlarged sectional view through the valve taken along the line 5—5 of Figure 2.
Figure 6 is a sectional view through the valve taken at right angles to Figure 5 along the line 6—6 of Figure 2.
Figure 3:
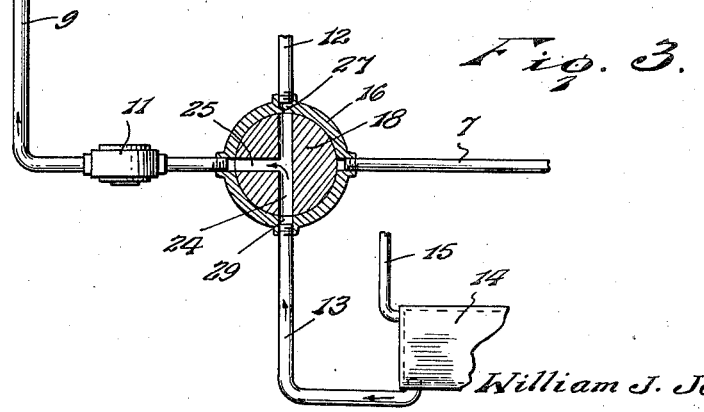
Figure 3 is a fragmentary view showing the valve turned to a position in which fuel may be drawn from the reserve tank.

The valve 8 serves to control flow of gasoline through all of the pipes 7, 9, 12, and 13 and consists of a cylindrical casing 16 which tapers upwardly and has its lower end closed by a head 17 which is threaded to the valve casing, as shown in Figures 5 and 6, in order that it may be removed when cleaning or repairs are necessary. A frusto-conical plug 18 is rotatably received in the valve casing and is formed with an actuating stem 19 which extends upwardly and at its upper end carries a crank arm 20 to which is attached an operating rod 21. This operating rod extends through the instrument panel of the automobile, as shown in Figure 1, and is, therefore, located in such position that the driver may easily grasp the operating rod and move the rod to impart rotation to the valve stem and adjust the valve plug without leaving the driver's seat. A cap 22 which is formed of thin resilient metal is disposed about the valve stem above the casing with its marginal portions resting upon the upper end of the valve casing and its intermediate portion in abutting engagement with a pin 23 carried by and projecting transversely from the valve stem. By this arrangement, the resilient cap will urge the valve stem and plug upwardly and cause the valve plug to have tight fit in the casing and thus prevent leakage. A port 24 having a side branch 25 is formed diametrically through the lower portion of the plug 18, and by referring to Figures 2 and 3 it will be seen that when the plug is in the position shown in Figure 2, the passage 24 will establish communication between the pipes 7 and 9 so that fuel may be drawn from the main tank by the pump, whereas when the plug is turned to the position shown in Figure 3, communication between the pipes 7 and 9 will be cut off and the branch 25 register with the pipe 9 so that communication will be established between the pipe 9 and the pipe 13 and fuel may be drawn from the reserve tank. Another bore 26 extends diametrically through the plug above the bore or passage 24 at right angles thereto and when the valve is in the position shown in Figure 2, this passage or bore registers with passages 27 and 28 formed in opposed portions of the wall of the casing. The passage 28 leads from the radially extending bore or passage 29 into which one end of the pipe 13 is screwed and, therefore, when the valve plug is in the position shown in Figure 2 and gasoline is being drawn from the main tank through the pipes 7 and 9 and the passage 24 of the plug, surplus gasoline which rises to the upper level of the pipe 12 in the carbureter chamber will pass downwardly through the pipe 12 to the passage 27, then pass through the passage 26 of the plug and the passage 28 of the valve casing to the passage 29 from which it will pass through the pipe 13 and into the reserve tank. The reserve tank will thus be gradually filled with fuel and will move upwardly through the vent pipe 15 through which air escapes until the vent pipe is filled to the height of the upper end of the pipe 12. A float 30 is provided in the fuel chamber of the carbureter and carries a depending stem 31 which passes through the opening 32 at the upper end of the neck 10 and carries a ball 33 at its lower end which is disposed out of closing relation to the opening 32 as long as the level of the gasoline in the fuel chamber of the carbureter is no higher than the upper end of the pipe 12. If, however, the reserve tank is completely filled and fuel rises in the fuel chamber to a level normally maintained in the fuel chamber, the float will be moved upwardly a sufficient distance to move the ball or closure 33 into position to close the passage 32 and prevent further flow of gasoline through the pipe 9 into the carbureter. When the supply of fuel in the main tank is exhausted and it is desired to use the reserve which has accumulated in the tank 14, the valve plug 18 will be turned from the position shown in Figure 2 to that shown in Figure 3. This will cut off communication between the pipes 7 and 9 and establish communication between the pipes 9 and 13 and the pump may then draw gasoline from the reserve tank and deliver it through the pipe 9 to the carbureter. Turning of the valve to the position shown in Figure 3 will also cut off communication between the passages 27 and 28 so that there will be no flow of fuel from the fuel chamber to the reserve tank and to prevent the admittance of air through the pipe 12 to and through passages 24 and 25 to the fuel pump 11 or the vacuum tank shown in Figure 4.

In case a vacuum tank is used, it will be mounted at a position high enough to cause flow of fuel to the carbureter at all times. As shown in Figure 4, the pipe 34, which takes the place of the pipe 9, leads from the valve casing to the upper end of the vacuum tank. A discharge pipe 35 leads from the bottom of the vacuum tank 6 and will be connected with the inlet neck of the carbureter. A pipe 36 which takes the place of the pipe 12 and serves as a fuel flow pipe for the reserve tank has its upper end bent to form an elbow 37 to prevent flow of fuel to the reserve tank until there is a sufficient quantity of fuel in the fuel chamber of the carbureter. This elbow 37 is located at a position lower than the normal level of the fuel in the bottom of the reserve tank. The reserve tank vent pipe 15 (not shown in Figure 4) has its upper extremity located at a level higher than the normal level of the fuel in the lower chamber of the vacuum tank. The pipe 38 leading from the top of the vacuum tank will be connected with the intake manifold of the engine or any other means which may be used for creating a vacuum in the upper chamber of the vacuum tank. It will thus be seen that the invention may be employed in connection with an automobile having a vacuum tank or one in which the gasoline or other fuel is delivered by means of a pump direct to the carbureter. It will also be noted that the carbureter may be either of the updraft type or downdraft type in which it is located above the engine manifold instead of below the same.

Having thus described the invention, what is claimed as new is:

1. In an apparatus of the character described, a main tank, a reserve tank, a chamber to receive fuel from either of said tanks, a fuel flow pipe for said chamber extending vertically through the bottom thereof with its inner end spaced upwardly from the bottom of the chamber, a pipe leading from the main tank, a pipe leading from the reserve tank, a supply pipe extending downwardly from the bottom of the chamber, and a valve consisting of a casing having ports receiving all of said pipes and a control member mounted in the casing and being adjustable to selectively establish communication between the supply pipe and the pipe leading from a selected one of said tanks, the control member being also adapted to establish communication between the fuel flow pipe and the pipe of the reserve tank when communication is cut off between the supply pipe and the pipe leading from the main tank.

2. In an apparatus of the character described, a main tank, a reserve tank, a chamber to receive fuel from a selected one of said tanks located in a plane above said tanks, a pipe leading from the reserve tank, a pipe leading from the main tank, pipes leading from said chamber, one of the pipes leading from the chamber being a supply pipe connected with and leading from the bottom of the chamber and the other a fuel flow pipe having a vertically disposed upper end portion extending into the chamber through the bottom thereof and having its end spaced upwardly from the bottom of the chamber, and a valve consisting of a casing connected with all of said pipes and a control member in the casing movable to set positions to selectively establish communication between the pipes of the tanks and the supply pipe of the chamber and being also movable into position to establish communication between the fuel flow pipe and the pipe of the reserve tank when communication between the supply pipe and the pipe leading from the reserve tank is cut off.

3. In an apparatus of the character described, a main tank, a reserve tank, a chamber to receive fuel from a selected one of said tanks, a fuel flow pipe for the chamber extending upwardly through the bottom thereof with its inner end spaced upwardly from the bottom of the chamber, and a valve having means to selectively establish individual communication between the chamber and said tanks and effect delivery of fuel from the selected tank to the chamber, said means also having means to establish communication between the fuel flow pipe and the reserve tank when communication between the main tank and the chamber is established.

4. In an apparatus of the character described, a main tank, a reserve tank, a carbureter including a fuel chamber located in a plane above said tanks, a pipe leading from the main tank, a pipe leading from the reserve tank, a fuel flow pipe extending upwardly into the carbureter chamber with its inner end spaced upwardly from the bottom thereof, a fuel supply pipe leading from the carbureter chamber, a pump in the supply pipe, a valve consisting of a casing connected with all of said pipes and having an adjustable control plug rotatable in the casing to set positions for selectively establishing communication between the supply pipe and the pipe leading from a selected one of said tanks, the plug being also adapted to establish communication between the fuel flow pipe and the pipe leading from the reserve tank when the supply pipe is in communication with the pipe leading from the main tank, and a vent pipe extending from the reserve tank and terminating in a plane above the upper end of the fuel flow pipe.

WILLIAM J. JOHNSON.